(12) United States Patent
Schwarzkopf

(10) Patent No.: US 9,337,758 B2
(45) Date of Patent: May 10, 2016

(54) METHOD AND DEVICE FOR DETERMINING THE POSITION OF A BRUSHLESS ELECTRIC DRIVE

(71) Applicant: Brose Fahrzeugteile GmbH & Co. KG, Wuerzburg, Wuerzburg (DE)

(72) Inventor: Johannes Schwarzkopf, Marktheidenfeld (DE)

(73) Assignee: Brose Fahrzeugteile GmbH & Co. KG, Wuerzburg, Wuerzburg (DE)

( * ) Notice: Subject to any disclaimer, the term of this patent is extended or adjusted under 35 U.S.C. 154(b) by 31 days.

(21) Appl. No.: 14/531,606

(22) Filed: Nov. 3, 2014

(65) Prior Publication Data
US 2015/0054441 A1 Feb. 26, 2015

Related U.S. Application Data

(63) Continuation of application No. PCT/EP2013/001298, filed on May 2, 2013.

(30) Foreign Application Priority Data

May 2, 2012 (DE) .......................... 10 2012 008 882
Jul. 10, 2012 (DE) .......................... 10 2012 013 652

(51) Int. Cl.
*H02P 6/06* (2006.01)
*H02P 6/18* (2016.01)
(52) U.S. Cl.
CPC ................ *H02P 6/185* (2013.01); *H02P 6/182* (2013.01); *H02P 6/186* (2013.01); *H02P 6/187* (2013.01)
(58) Field of Classification Search
CPC .............................. H02P 2101/45; H02P 9/307
See application file for complete search history.

(56) References Cited

U.S. PATENT DOCUMENTS

| 8,766,579 B2 | 7/2014 | Scheit et al. |
| 2002/0097027 A1* | 7/2002 | Asao ....................... H02P 9/307 322/28 |
| 2003/0193306 A1 | 10/2003 | Griffitts |
| 2007/0031131 A1 | 2/2007 | Griffitts |

FOREIGN PATENT DOCUMENTS

| DE | 10 2007 063 386 A1 | 7/2009 |
| DE | 10 2009 045 247 A1 | 4/2011 |

OTHER PUBLICATIONS

Le et al., "Improved Rotor Position Estimation in Extended Back-EMF Based Sensorless PM Brushless AC Drives with Magnetic Saliency," IEEE Int'l Elec. Mach. & Drived Conf. 2007, vol. 1, pp. 214-219 (May 2007).

* cited by examiner

*Primary Examiner* — Karen Masih
(74) *Attorney, Agent, or Firm* — Muncy, Geissler, Olds & Lowe, P.C.

(57) ABSTRACT

A method for determining the position of an at least two-phase, in particular three-phase bmshless electric drive comprising at least two phase windings, each of which has a first and a second terminal, a second terminal of a first phase winding being electrically connected to the first terminal of a second phase winding at a common connecting terminal. In order to be able to reliably determine the position of the electric drive even at low speeds, a voltage pulse is applied between the first terminal of the first phase winding and the second terminal of the second phase winding, the resulting voltage at the connecting terminal or at a third phase winding connected thereto is detected and the voltage ratio between the first phase winding and the second phase winding is determined therefrom, and the ratio between the variable inductances is determined from said voltage ratio.

9 Claims, 2 Drawing Sheets

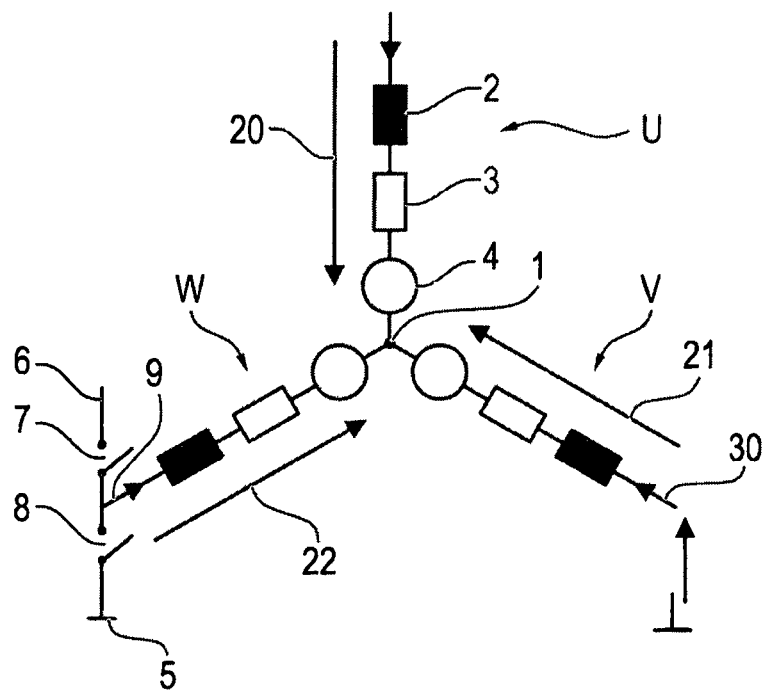
FIG. 1
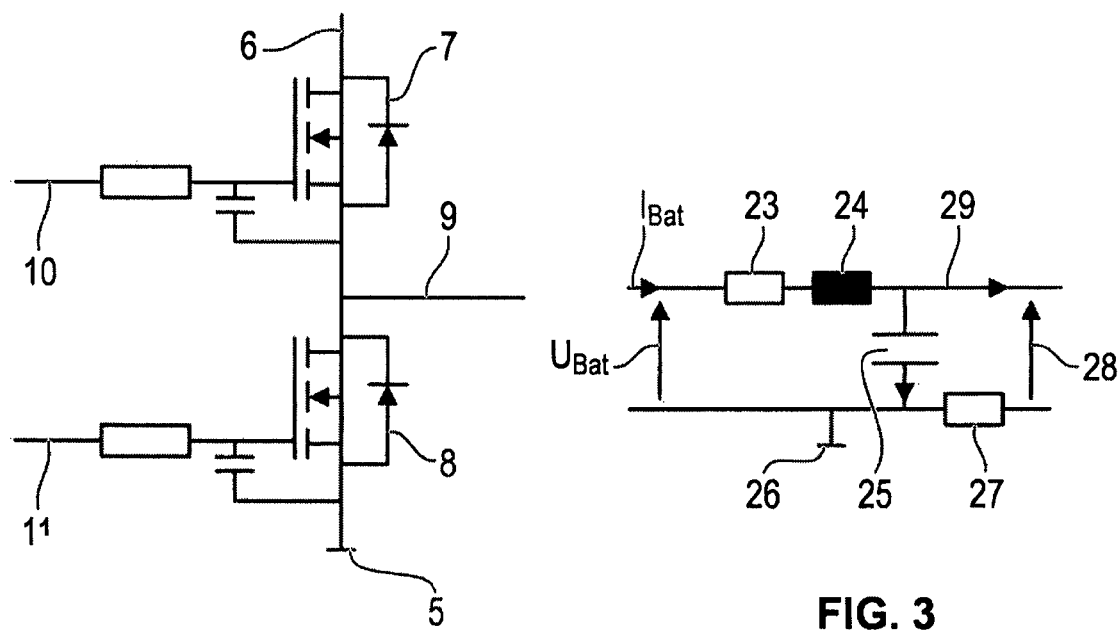
FIG. 2
FIG. 3

METHOD AND DEVICE FOR DETERMINING THE POSITION OF A BRUSHLESS ELECTRIC DRIVE

This nonprovisional application is a continuation of International Application No. PCT/EP2013/001298, which was filed on May 2, 2013 and claims priority to German Patent Application No. DE 10 2012 008 882.5 filed in Germany on May 2, 2012, and to German Patent Application No. 10 2012 013 652.8 filed in Germany on Jul. 10, 2012, which are all herein incorporated by reference.

BACKGROUND OF THE INVENTION

1. Field of the Invention

The present invention relates to the field of electric drives and relates to brushless electric drives and to determining their position.

2. Description of the Background Art

In order to avoid the known disadvantages of electric drives, in particular electric motors with mechanical commutator devices in the form of brushes and the brush arcing that they produce as well as the wear problems of the mechanical commutator device with attendant losses in effective power, the possibilities of power electronics have been exploited to develop so-called brushless electric drives whose susceptibility to failure is significantly lower and whose wear is essentially determined by bearing wear and is therefore very low.

In a brushless electric drive of this kind, the rotor has a number of permanent magnets that move in a rotating magnetic field of the stator, which is provided with phase windings or wire-wound coils. The coils of the stator are activated with power semiconductor switches, in particular power transistors, in particular MOSFETs. The different phase windings of the stator are activated in cyclical fashion. In order to permit a reliable activation and control of a drive of this kind, it is necessary to determine the actual position of the rotor in order to minimize speed differences between the setpoint speed and the actual speed. This also makes it possible to optimally react to changing loads on the drive.

To determine the position of a rotor of this kind in a brushless electric drive, it is possible to use Hall sensors. An embodiment of this kind, however, is cost-intensive and susceptible to failure.

In addition, the voltage induced in the stator winding by the rotary motion of the rotor, the so-called electromotive force (EMF), is used for determining the position and speed. This method, however, is particularly unreliable at low speeds and does not function at the lowest speeds.

It is also conceivable to determine the respective current-induced voltage via the phase windings, which depend in a known way on the change in the supply current and the variable inductance. Measuring methods of this kind, however, can suffer from powerful interference when activated with pulse width modulated signals and also—when special measurement pulses are used—require a particular minimum duration of the measurement pulse in order to be able to determine a specific change in current. Correspondingly long measurement pulses, however, can interfere with the drive and produce torque ripples.

SUMMARY OF THE INVENTION

It is therefore an object of the present invention to provide a method and device for determining the position of brushless electric drives that avoid the disadvantages of the prior art and, with particularly low design and circuitry complexity, permit a reliable position determination even at low speeds and when a drive is at a standstill.

The invention therefore relates to a method for determining the position of an at least two-phase, in particular three-phase, brushless electric drive with at least two phase windings that each have a respective first and second terminal. A second terminal of a first phase winding is electrically connected to the first terminal of a second phase winding at a shared connecting point.

In this connection, the term "phase winding" is understood to mean a winding of the stator that is supplied by a phase or to mean a group of windings of the stator that is supplied by an individual phase. Such a group of windings can, for example, have a number of individual windings that corresponds to the number of pole pairs of the rotor. In the context of the invention, the term "brushless electric drive" is understood to mean, for example, a brushless three-phase electric motor with a star connection or delta connection. Basically, however, the invention can also be used, for example, in linear drives.

According to an embodiment of the invention, at least one voltage pulse is applied between the first terminal of the first phase winding and the second terminal of the second phase winding. The voltage prevailing at the connecting point or at a third phase winding connected thereto is detected and based on this, the voltage division ratio between the first phase winding and the second phase winding is determined; particularly if the voltage occurring is to be detected in the third phase winding, the voltage pulse is applied while the third phase winding is currentless. The voltage division ratio is used as a basis for determining the ratio between the variable inductances. Consequently, two respective series-connected phase windings are considered, which during the time of the measurement have the same current flowing through them, with the time derivative of the current being equal for the two phase windings.

The connecting point can be embodied in the form of a star point of the windings; it is also possible, however, to provide a so-called delta winding.

The ratio of the voltage drops of the two phase windings, as explained in greater detail below, yields the ratio of the variable winding inductances at the time of the measurement. This ratio is dependent on the position of the drive, i.e. the position of the permanent magnets in the rotor relative to the windings of the stator, so that based on the ratio, taking into account the periodicity and in particular the intermediate circuit voltage, it is possible to infer the relative position and therefore the rotation angle of the rotor or at least to determine a zero crossing of the voltage.

In an embodiment, the voltage induced in the phase windings by the movement of the electric drive can be determined and this is taken into account in the determination of the voltage division ratio of the applied voltage pulse between the phase windings.

The division of the voltage that occurs upon application of a voltage pulse via the series circuit of two phase windings primarily depends on the ratio of the variable inductances of the individual phase windings. There is, however, also a dependence on the time derivative of the inductance (which can be ignored here) and on the induced voltage (EMF), i.e. on the currents and voltages induced in the individual phase windings by the relative movement of the stator and rotor. These latter induced voltages are nonexistent at a speed of zero and increase in linear fashion with the speed of the drive. Since the induced voltages usually have a different periodicity than the voltages induced by current changes in the windings, by simultaneously taking into account both effects, which can be additive depending on the application, it is possible to achieve a higher sensitivity and therefore also a better spatial resolution.

For this purpose, it can be advantageous, after the application of a first voltage pulse (and after the end of said voltage), to apply a voltage pulse, which is of a reverse polarity and is in particular of the same magnitude, or a differently defined voltage pulse, for example also a zero pulse. Due to the reversal of the voltage pulse at the measuring device and due to the comparison of the respectively measured voltage division occurring, it is possible to determine whether the voltages that drop at the inductances (and that are determined by the applied voltage pulse) are of the reverse polarity of the voltages induced by the relative movement or whether the two voltages are of the same polarity. In other words, it is possible to determine whether the respective measurement has taken place after a positive, rising zero crossing of the induced voltage (EMF) or after a negative zero crossing of the EMF.

In another embodiment of the invention, a comparison is made as to which polarity of the applied voltage pulse at the connecting point yields a higher voltage.

Since in the context of the method according to the invention, no reaction of the current that is delayed in the inductances is observed, but instead a static voltage division is observed, even short voltage pulses are sufficient, which only exert a minimal influence on the ripple of the drive control and the resulting torque.

The pulse duration of the voltage pulse here can be advantageously set to between 1 μs and 20 μs, in particular between 2 μs and 10 μs, and even more particularly to 5 μs.

For the detection of the voltage at the connecting point, it can also be advantageous to use a voltage pulse that is provided as a drive pulse in the activation of the electric drive. Such a voltage pulse can be lengthened as needed if this is advantageous for the measurement according to the invention.

The actual drive activation can take place in various ways by using a power semiconductor circuit to apply DC voltage pulses to the phase windings, which pulses change or are constant over time. Preferably, the pulse width modulation method is used here, in which a cyclically variable activation intensity is periodically controlled by means of DC voltage pulses that are chronologically more or less dense or more or less long-lasting, i.e. with a different duty cycle. Both the chronological density (frequency) and the pulse width can therefore be modulated. One of the above-mentioned DC voltage pulses can then be used for purposes of the position determination according to the invention. In this case, this does not influence the actual drive activation.

The method according to the invention especially also relates to a method for position determination of a three-phase electric drive in which the connecting point is used to connect a first terminal of a third phase winding; the voltage pulse is applied while the third phase winding is currentless.

The above-mentioned method is suitable in both a star connection and a delta connection in order to ensure that the voltage level at the connecting point is determined solely by the current that is driven by the voltage pulse, which current flows through the first and second phase windings and causes corresponding voltage drops at the inductances. In addition, there are the voltages induced in the first and second phase windings by the relative movement of the stator and rotor, but these can be either ignored or taken into account depending on the speed at which the measurement is carried out.

The voltage occurring at the connecting point, which in the case of the star connection is identical to the star point, can then also be measured at the third phase winding.

If only the signs of the measured voltage drops at the individual phase windings are taken into account, then a resolution of 15° with regard to an entire cycle of drive activation is possible. If the amounts of the voltage measurements are taken into account, then a more precise resolution is possible.

In an embodiment of the method according to the invention, in order to determine the position of such a three-phase electric drive in which a third phase winding is connected between the first terminal of the first phase winding and the second terminal of the second phase winding, the voltage pulse is applied while the third phase winding is currentless. This method especially relates to a delta connection of a three-phase drive with one phase winding per phase.

In addition to a method for determining the position of an electric drive, the invention also relates to a device for carrying out such a method for a brushless electric drive, in particular with three phases in a star connection or delta connection. According to the invention, a measuring device—which has a voltage source and at least one electronic switch for applying a defined voltage pulse via two phase windings connected to each other at a connecting point—and a voltage measuring device—which is for measuring the voltage at the connecting point—are provided.

Advantageously, the measuring device can have a device for applying a defined voltage pulse either to a first and second phase winding connected to each other or to a first and third phase winding connected to each other and can have a device for measuring the voltage at the connecting point. In this case, the phase windings that are connected in pairs are in particular connected in series.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 schematically depicts the phase windings of an electric drive in a star connection, FIG. 2 shows a bridge circuit for activating a respective phase winding of a drive, FIG. 3 shows an equivalent circuit diagram for an electric drive in a delta connection.

DETAILED DESCRIPTION

Figure 4:
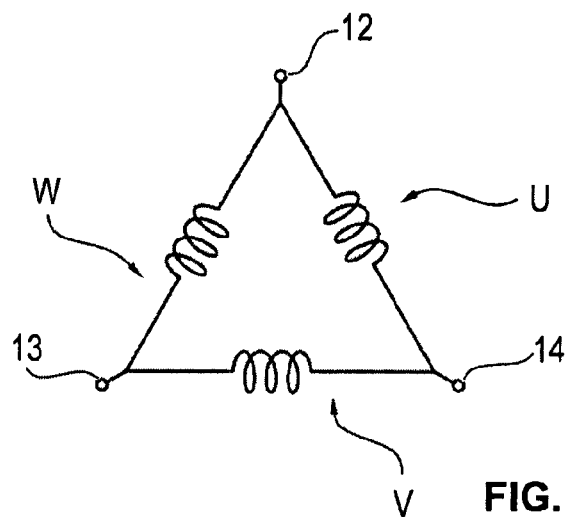
FIG. 4 shows a schematic equivalent circuit diagram for an electric drive in a delta connection.

FIG. 1 schematically depicts a star connection of three-phase windings U, V, W, in which the star point 1 is the connecting point between two respective phase windings U, V, W. The individual phase windings are depicted in the form of an equivalent circuit diagram with a respective inductance 2 and an ohmic resistance 3 as well as a voltage drop, which—represented by the circle 4—is produced by means of a voltage (EMK, EMF) that is induced because of movement.

If one of the three phase windings is assumed to be currentless, then there is a respective series circuit of the two remaining phase windings, which are connected at the star point 1. The voltage that drops via a phase winding U, V, W is represented by the arrows 20, 21, and 22, respectively, and is respectively calculated as the sum of the voltage drops via the inductance, the ohmic resistance, and the induced voltage.

A brushless electric drive operated in a star connection can be activated, for example, via a so-called B6 circuit in which a higher DC voltage level or a lower DC voltage level, in particular ground potential, can be selectively applied to each of the phase windings. It is thus possible to control such an electric drive with regard to the speed, output, and rotation direction.

For example, an arrangement of two switches for the phase W is shown in FIG. 1, where the reference numeral 5 indicates the ground potential terminal and 6 indicates a higher DC voltage potential. Via the switches 7, 8, the first terminal 9 of the phase winding W can be connected to either the higher DC voltage potential or the ground potential. If the switch 7 is closed and the switch 8 is open, then the terminal 9 is connected to the higher voltage potential. If the switch 7 is open and the switch 8 is closed, then the first terminal 9 of the phase winding W is connected to the ground potential. It is thus possible to act on the phase winding U, V, W with two different voltage levels depending on the switch position of the individual switches 7, 8.

FIG. 2 is a more detailed depiction of the possible design of a circuit with an arrangement of two semiconductor switches 7, 8 analogous to the depictions in FIG. 1, via which two different voltage potentials can be selectively connected to the phase winding U, V, W. The phase winding terminal is labeled with the reference numeral 9. A low voltage level, for example the ground potential, is identified with the ground potential terminal 5 while the higher DC voltage potential is present at the terminal 6. The switches 7, 8 are embodied in the form of MOSFETs, which can switch into either a conductive state or a nonconductive state and which can be triggered with regard to their switched state by a control voltage. The control voltage inputs are labeled with the reference numerals 10 and 11 in FIG. 2. Through corresponding triggering of the control voltage inputs 10, 11, it is thus possible to selectively transmit a DC voltage pulse of a higher voltage level or lower voltage level or ground potential to a phase winding U, V, W of a circuit, for example of a star connection of an electric drive.

FIG. 3 shows an equivalent circuit diagram for a voltage source, which, at terminal 6, can for example supply the higher voltage level in FIG. 2 relative to ground potential. The reference numeral 23 indicates the internal resistance of the voltage source, 24 indicates the inherent inductance, 25 indicates the capacitance, 26 indicates the ground potential terminal, 27 indicates a shunt (measurement resistor) at which the useful voltage drops, 28 indicates the supplied useful voltage, and 29 indicates the supplied current. Current and voltage are supplied, for example, by a battery (indicated at the left side of the circuit).

A voltage source of this kind is also suitable, with the aid of the above-described semiconductor switches 7, 8, for applying a measurement signal in the form of a DC voltage pulse—using the method according to the invention—to one of the phases or between two external terminals of two phases connected to each other in series.

Usually, a star connection according to FIG. 1 has respective semiconductor switch bridges for each phase winding, as shown by way of example in FIG. 2. Furthermore, the battery terminal can be provided, which in addition to the drive activation, supplies a voltage pulse for the measurement method according to the invention.

The analogous case is true for a delta connection schematically depicted in FIG. 4, which likewise can serve as a typical circuit of an electric drive, with corresponding drive characteristics that differ in a known way from those of a star connection. The statements made above in connection with FIG. 1 are applicable to the individual phase windings of the phases U, V, W. The activation can also be implemented in a fashion similar to that of a star connection with regard to the hardware, with possible differences in the regulating mechanisms of the activation function.

The method according to the invention can also be used in a delta connection as shown in FIG. 4, in that a voltage pulse is applied to a respective series circuit of two phase windings U, V, W while the third phase winding is currentless. For example, a voltage can be applied to the series-connected phase windings U, V by applying the voltage between the terminals 12, 13 while the phase winding W remains currentless. Then, as demonstrated in connection with FIG. 1, a voltage division via the phase windings U and V takes place, where the connecting point is constituted by the terminal 14 and the divided voltage can be detected there.

In the same way, a voltage pulse can be applied via the phase windings V and W by applying the corresponding voltage to the terminals 12 and 14 and detecting a measurement voltage at the connecting point 13. Consequently, a position determination by means of the method according to the invention is also possible for electric drives arranged in a delta connection.

The possibility of using the voltage division between two phase windings U, V, W with the simultaneous currentless state of the third phase to infer the inductances and thus the position of the rotor magnets relative to the stator-mounted phase windings U, V, W is based on the following consideration:

The inductance $L_{phase\_U}$ of a phase is composed of a constant part of the inductance of the winding itself and of a part $L_{var}*\cos(x*(\alpha+\alpha_0))$ that is periodically determined by the convergence and divergence of the magnets of the rotor and their permeability. The factor x determines which harmonic is considered.

In the following, only the second harmonic of the variable inductance is considered. The following equations apply for the different phase windings:

$$L_{phase\_U} = L_0 + L_{var}*\cos(2*(\alpha+\alpha_0)),$$

$$L_{phase\_V} = L_0 + L_{var}*\cos\left(2*\left(\alpha+\alpha_0+\frac{2\pi}{3}\right)\right), \text{ and}$$

$$L_{phase\_W} = L_0 + L_{var}*\cos\left(2*\left(\alpha+\alpha_0-\frac{2\pi}{3}\right)\right),$$

where $L_0$ is the constant component of the variable inductance, $L_{var}$ is the variable component of the inductance, and $\alpha$ is the electrical angle between the rotor and the stator. When $\alpha=0$, the EMF of the phase U has a positive zero crossing and $\alpha_0$ is the phase position of the variable inductance.

The following equation applies for the voltage drop at the inductance:

$$U_{phase\_x} = L_{phase\_x} * \frac{dI_{phase\_x}}{dt} + I_{phase\_x} * \frac{dL_{phase\_x}}{dt}.$$

In this case, the component of the change in inductance can be ignored. This yields the following equation:

$$U_{phase\_x} = L_{phase\_x} * \frac{dI_{phase\_x}}{dt}.$$

Evaluation and determination of the position:

Special case: the voltage pulse for the measurement occurs during the zero crossing of the EMF in the currentless phase.

One phase remains currentless (in this case: phase U):

Consequently, the amperage through the two other phases is equal due to the series circuit arrangement.

The following approximations apply for the induced voltages:

$$U_{EMF\_U} = U_0 * n * \sin(\alpha),$$

$$U_{EMF\_V} = U_0 * n * \sin\left(\alpha + \frac{2\pi}{3}\right), \text{ and}$$

$$U_{EMF\_W} = U_0 * n * \sin\left(\alpha - \frac{2\pi}{3}\right),$$

where n is the speed and $U_0$ is the induced voltage at the speed 1.

If phase W is connected to ground and phase V is connected to the voltage signal $U_z$ at the terminal 6 by closing the switch 7 and if phase U is currentless, then this yields the following:

$$U_Z = 2 * I_{phase\_V} * R_{phase} + U_{L\_phase\_V} - U_{L\_phase\_W} + U_{EMF\_V} - U_{EMF\_W}$$

where:

$$U_{L\_phase\_V} = L_{phase\_V} \frac{dI_{phase\_V}}{dt} + I_{phase\_V} \frac{dL_{phase\_V}}{dt}$$

$$U_{L\_phase\_W} = L_{phase\_W} \frac{dI_{phase\_W}}{dt} + I_{phase\_V} \frac{dL_{phase\_W}}{dt}$$

and $$U_{L\_phase\_W} = L_{phase\_W} \frac{-dI_{phase\_V}}{dt} - I_{phase\_V} \frac{dL_{phase\_W}}{dt}$$

If the influence of the derivative of the inductance is negligible, then this yields the following equations:

$$U_{L\_phase\_V} = L_{phase\_V} \frac{dI_{phase\_V}}{dt},$$

$$U_{L\_phase\_W} = L_{phase\_W} \frac{-dI_{phase\_V}}{dt}, \text{ and}$$

$$\frac{U_{L\_phase\_V}}{U_{L\_phase\_W}} = \frac{L_{phase\_V}}{L_{phase\_W}}.$$

This correspondingly causes a shift in the potential of the star point and together with it, in the voltage in phase U.

In other words: one phase is currentless, different defined potentials (voltage pulses) are applied to the series circuit of the two other phases (GND=ground potential and $U_z$), a part of the voltage drops at the resistances and the induced voltage, the remaining residual voltage (at low speeds, the preponderance of it) drops at the inductances and the voltage division ratio, which can be picked up at the star point or in the currentless phase, reflects the ratio of the inductances prevailing at the time of the measurement.

It therefore follows that by means of the voltage in the currentless phase, which changes periodically with the rotation of the rotor, it is possible to determine the position of the rotor.

Figure 5:
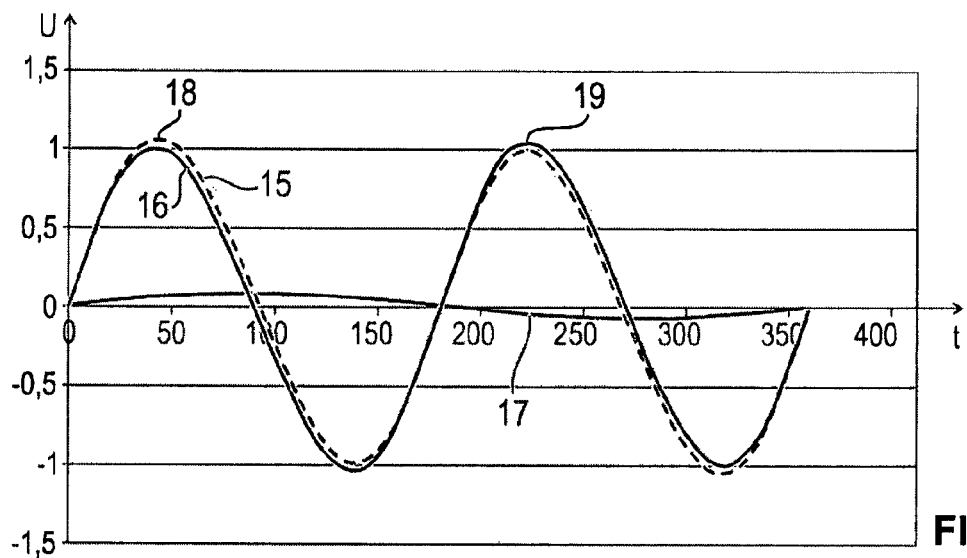
FIG. 5 shows a chronological representation of the curve of the voltage drop at the inductance of a phase winding in the course of the voltage division and the curve of the induced voltage (EMF, EMK) at a first low speed.

FIG. 5 shows the chronological progression on the horizontal axis of a measured voltage drop over the course of a complete deactivation cycle of a drive, measured in degrees, where 360° is a complete cycle. A measured voltage is respectively plotted on the y axis. This voltage can be used to determine the respective effective inductance. In the drawing, the curve 15 depicted with a dashed line represents the measured voltage drop, which is the sum of the influences of the voltage drop of the applied measurement voltage pulse at the inductances added to the voltage induced by the relative movement. The actually induced voltage is represented by curve 17. This influence is relatively small in the scenario of a low speed that is assumed in FIG. 5; here, too, the induced voltage is correspondingly low.

The reference numeral 16 indicates the continuous curve that reflects the partial voltages that drop at the inductances of the phase windings due to the voltage division of the applied measurement voltage and the voltage division that results from this. The influence of the induced voltage by the relative movement of the stator and rotor, represented by the curve 17, is calculated based on this curve 16.

When the applied measurement voltage pulse reverses, the polarity of the curve 16, i.e. the voltage division produced purely by the voltage drop, reverses. Even if only the amount of the total voltage 15 is measured, it turns out that by means of the difference between the maxima 18, 19 at which on the one hand, the voltage dropping at the inductances has the same polarity as the induced voltage and on the other hand, when the two have opposite polarities, it is possible to determine whether the measurement has taken place at a positive zero crossing of the induced voltage or at a negative (falling) zero crossing of the induced voltage. As a result, through the voltage reversal, it is possible to differentiate between the individual peaks of the total voltage detected at the connecting point, thus making it possible to increase the resolution of the position determination.

Figure 6:
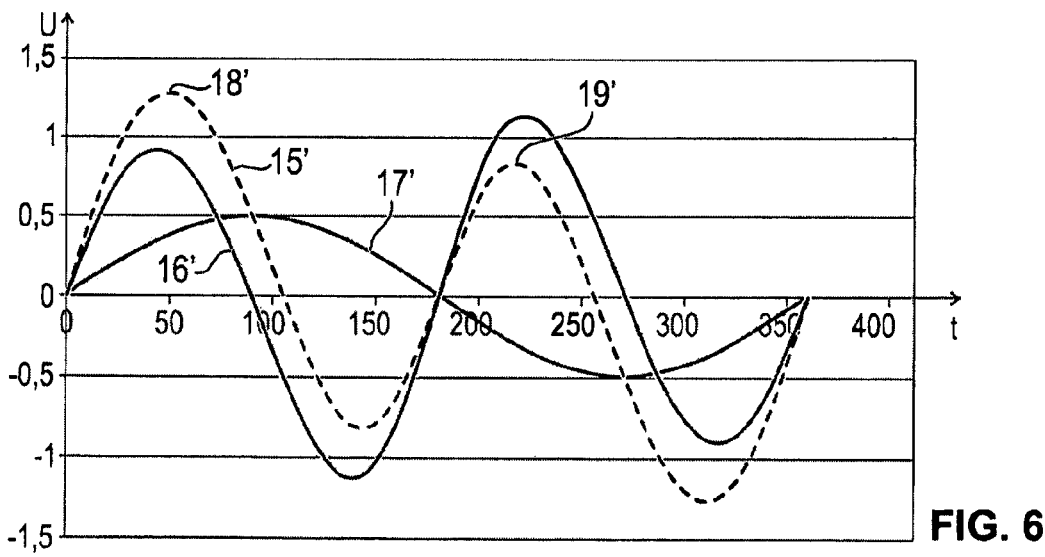
FIG. 6 shows a chronological sequence graph that corresponds to the graph in FIG. 5 at a higher speed.

FIG. 6 shows a configuration similar to that of FIG. 5, but at a higher speed of the drive. It is clear that the induced voltage, represented by the curve 17', is significantly higher and exerts a greater influence on the measured voltage 15' at the connecting point. In this case, there is a large difference in magnitude between the voltage measurement at the first peak 18' and the voltage measurement at the second peak 19' so that it is easier to differentiate between a positive and negative zero crossing of the induced voltage.

The reference numeral 16' indicates the voltage at the connecting point resulting purely from the voltage division at the inductances, which is obtained by calculating the difference between the voltage measured at the connecting point and the separately determined voltage induced by rotation.

The use of the method according to the invention is not limited to the exemplary embodiments discussed above, particularly not to the depicted circuits of the phase windings and the depicted activation circuits.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a position of an at least two-phase or three-phase brushless electric drive with at least two phase windings that each have a respective first and second terminal, a second terminal of a first phase winding being electrically connected to the first terminal of a second phase winding at a shared connecting point, the method comprising:
   applying at least one voltage pulse between the first terminal of the first phase winding and the second terminal of the second phase winding;
   detecting a voltage prevailing at the connecting point or at a third phase winding that is connected to it;
   determining a voltage division ratio between the first phase winding and second phase winding based on the detected voltage; and
   determining, based on the voltage division ratio, a ratio between the variable inductances, wherein, if the prevailing voltage is to be detected in the third phase winding, the voltage pulse is applied while the third phase winding is currentless.

2. The method according to claim 1, wherein the voltage induced in the phase windings by a movement of the electric drive is determined and is taken into account in the determination of the voltage division ratio between the phase windings.

3. The method according to claim 2, wherein, after the application of a first voltage pulse and after the end of this voltage pulse, another defined voltage pulse is applied, which is of a reverse polarity and is of a same magnitude.

4. The method according to claim 3, wherein a comparison is made as to which polarity of the applied voltage pulse at the connecting point yields a higher voltage.

5. The method according to claim 4, wherein a pulse duration is between 1 μs and 20 μs, between 2 μs and 10 μs, or is 5 μs.

6. The method according to claim 1, wherein a voltage pulse that is provided as a drive pulse in the activation of the electric drive is used for the detection of the voltage at the connecting point.

7. The method according to claim 1, wherein, for determining the position of a three- or more phase electric drive, in which a third phase winding is connected between the first terminal of the first phase winding and the second terminal of the second phase winding and the voltage pulse is applied while the third phase winding is currentless.

8. A device for carrying out a method according to claim 1, for a brushless electric drive with three phase windings in a star connection or delta connection, wherein a measuring device is provided with a voltage source and with at least one electrical switch for applying a defined voltage pulse via two phase windings connected to each other at a connecting point, and with a voltage measuring device for measuring the voltage at the connecting point.

9. The device according to claim 8, wherein the measuring device selectively applies a defined voltage pulse either to a first and second phase winding connected to each other or to a first and third phase winding connected to each other or also to a second and third phase winding connected to each other and measures the respective voltage at the connecting point.

* * * * *